United States Patent
Aouad et al.

(10) Patent No.: US 11,275,831 B1
(45) Date of Patent: Mar. 15, 2022

(54) SYSTEMS AND METHODS FOR DETECTING ANOMALOUS SYSTEM COMMAND LINE DATA

(71) Applicant: Symantec Corporation, Mountain View, CA (US)

(72) Inventors: Lamine Aouad, Paris (FR); Slawomir Grzonkowski, Dublin (IE)

(73) Assignee: NortonLifeLock Inc., Tempe, AZ (US)

( * ) Notice: Subject to any disclaimer, the term of this patent is extended or adjusted under 35 U.S.C. 154(b) by 530 days.

(21) Appl. No.: 16/371,068

(22) Filed: Mar. 31, 2019

(51) Int. Cl.
*G06F 21/55* (2013.01)
*G06N 20/10* (2019.01)

(52) U.S. Cl.
CPC ........... *G06F 21/554* (2013.01); *G06N 20/10* (2019.01); *G06F 2221/034* (2013.01)

(58) Field of Classification Search
None
See application file for complete search history.

(56) References Cited

U.S. PATENT DOCUMENTS

| | | | |
|---|---|---|---|
| 10,521,587 B1* | 12/2019 | Agranonik | G06N 3/0445 |
| 10,579,796 B1* | 3/2020 | Neel | G06F 21/563 |
| 2019/0163905 A1* | 5/2019 | Woodworth | G06F 21/562 |
| 2019/0188384 A1* | 6/2019 | Tanda | G06F 21/51 |
| 2019/0273510 A1* | 9/2019 | Elkind | G06F 8/74 |
| 2020/0159916 A1* | 5/2020 | Nguyen | H04L 63/1416 |
| 2020/0195683 A1* | 6/2020 | Kuppa | G06N 3/0472 |

OTHER PUBLICATIONS

Schölkopf et al., "Estimating the Support of a High-Dimensional Distribution", URL: http://users.cecs.anu.edu.au/~williams/papers/P132.pdf, vol. 13, Jul. 2001, pp. 1443-1471.
Bohannon, Daniel, "Invoke-Obfuscation", URL: https://github.com/danielbohannon/Invoke-Obfuscation, Sep. 25, 2016, 5 pages.
Woodbridge, Jonathan, "Employing Latent Semantic Analysis To Detect Malicious Command Line Behavior", URL: https://www.endgame.com/blog/technical-blog/employing-latent-semantic-analysis-detect-malicious-command-line-behavior, Feb. 17, 2016, 11 pages.
Hendler et al., "Detecting Malicious PowerShell Commands using Deep Neural Networks", URL: https://arxiv.org/pdf/1804.04177.pdf, Apr. 14, 2018, pp. 1-19.

\* cited by examiner

*Primary Examiner* — Christopher C Harris
(74) *Attorney, Agent, or Firm* — FisherBroyles, LLP (57) ABSTRACT

The disclosed computer-implemented method for detecting anomalous system command line data may include (i) receiving command line data from a target computing system, (ii) building a baseline model that utilizes machine-learning to analyze the command line data, the baseline model comprising a support-vector machine (SVM), natural language processing, and a hashing function, (iii) assigning, utilizing the baseline model, a score to each of a plurality of instances of the command line data, and (iv) identifying, based on the score, anomalous commands comprising potentially malicious data when any of the instances of the command line data fails to exceed a threshold. Various other methods, systems, and computer-readable media are also disclosed.

20 Claims, 7 Drawing Sheets

SYSTEMS AND METHODS FOR DETECTING ANOMALOUS SYSTEM COMMAND LINE DATA

BACKGROUND

Enterprise, consumer, and governmental computing systems are often victimized by stealth attacks by malicious actors that include hiding commands in command line data (e.g., POWERSHELL data) to evade detection. For example, an attacker may utilize various stealth techniques for injecting exploits and obfuscating malicious commands and arguments in command lines running on target computing systems.

Traditional detection and monitoring methods utilize tools that monitor commands in real-time or from event logs fail to detect newer techniques such as data obfuscation. Moreover, attempting to detect every possible version of known commands (e.g., variations) is often inefficient and unrealistic utilizing traditional detection and monitoring methods.

SUMMARY

As will be described in greater detail below, the present disclosure describes various systems and methods for detecting anomalous system command line data.

In one example, a method for detecting anomalous system command line data may include (i) receiving, by one or more computing devices, command line data from a target computing system, (ii) building, by the one or more computing devices, a baseline model that utilizes machine-learning to analyze the command line data, the baseline model comprising a support-vector machine (SVM), natural language processing, and a hashing function, (iii) assigning, by the one or more computing devices and utilizing the baseline model, a score to each of a plurality of instances of the command line data, and (iv) identifying, by the one or more computing devices and based on the score, anomalous commands comprising potentially malicious data when any of the instances of the command line data fails to exceed a threshold. In some embodiments, the hashing function may include a minhash function and a locality-sensitive hashing (LSH) index.

In some examples, the method may further include performing a security action that includes reporting the anomalous commands comprising the potentially malicious data to a network security administrator for analysis. In some embodiments, building the baseline model may include (i) extracting, utilizing the natural language processing, lexical information comprising clean data from the command line data, (ii) generating a one-class SVM from the extracted clean data, and (iii) combining the SVM with the hashing function to build the baseline model.

In some examples, the score may be assigned by (i) receiving the command line data instances in the hashing function, (ii) identifying a target data instance in the command line data instances having commands that are present in a clean index of the hashing function, and (iii) assigning a clean data score to the target data instance. Additionally or alternatively, the score may be assigned by (i) receiving the command line data instances in the hashing function, (ii) identifying a target data instance in the command line data instances having commands that are absent from a clean index in the hashing function, (iii) determining that the commands in the target data instance exceed the threshold, and (iv) assigning a clean data score to the target data instance. Additionally or alternatively the score may be assigned by (i) receiving the command line data instances in the hashing function, (ii) identifying a target data instance in the command line data instances having commands that are absent from a clean index in the hashing function, (iii) determining that the commands in the target data instance fail to exceed the threshold, (iv) receiving the target data instance in the SVM from the hashing function, (v) determining, by the SVM, that the commands in the target data instance are clean, and (vi) assigning a clean data score to the target data instance. Additionally or alternatively, the score may be assigned by (i) receiving the command line data instances in the hashing function, (ii) identifying a target data instance in the command line data instances having commands that are absent from a clean index in the hashing function, (iii) determining that the commands in the target data instance fail to exceed the threshold, (iv) receiving the target data instance in the SVM from the hashing function, (v) determining, by the SVM, that the commands in the target data instance are uncommon commands, and (vi) assigning an anomalous data score to the target data instance.

In some examples, the threshold may include command line data samples associated with high reputation data. In some embodiments, the SVM may determine that the target data instance is clean by determining that the commands are previously seen commands or a variant of previously seen commands in a clean index of the hashing function. In some examples, the commands may include near duplicate commands utilized by a dual-use application on the target computing system. In some embodiments, wherein the commands may include low reputation data.

In one embodiment, a system for detecting anomalous system command line data may include at least one physical processor and physical memory comprising computer-executable instructions and one or more modules that, when executed by the physical processor, cause the physical processor to (i) receive, by a receiving module, command line data from a target computing system, (ii) build, by a machine-learning module, a baseline model that utilizes machine-learning to analyze the command line data, the baseline model comprising a support-vector machine (SVM), natural language processing, and a hashing function, (iii) assign, by a scoring module and utilizing the baseline model, a score to each of a plurality of instances of the command line data, and (iv) identify, by an identification module and based on the score, anomalous commands comprising potentially malicious data when any of the instances of the command line data fails to exceed a threshold.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive command line data from a target computing system, (ii) build a baseline model that utilizes machine-learning to analyze the command line data, the baseline model comprising a support-vector machine (SVM), natural language processing, and a hashing function, (iii) assign, utilizing the baseline model, a score to each of a plurality of instances of the command line data based on the analysis by the baseline model, and (iv) identify, based on the score, anomalous commands comprising potentially malicious data when any of the instances of the command line data fails to exceed a threshold.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting anomalous system command line data. As will be described in greater detail below, by building a baseline model that utilizes the combination of a support-vector machine (SVM), natural language processing, and a hashing function to analyze command line data (e.g., POWERSHELL command line data), the systems and method described herein may enable the scoring of target command line data instances and subsequent identification of anomalous commands, including potentially malicious data, when any of the data instances fails to exceed a threshold corresponding to common near duplicate data or fails to correspond to data (or variations thereof) having a clean data reputation in an index. In addition, the systems and methods described herein may improve the functioning of a computing device by reducing the computing device's susceptibility to targeted command line data attacks through data obfuscation by reporting anomalous command line data as potentially malicious data to a threat protection service for further analysis and/or remediation.

Figure 1:
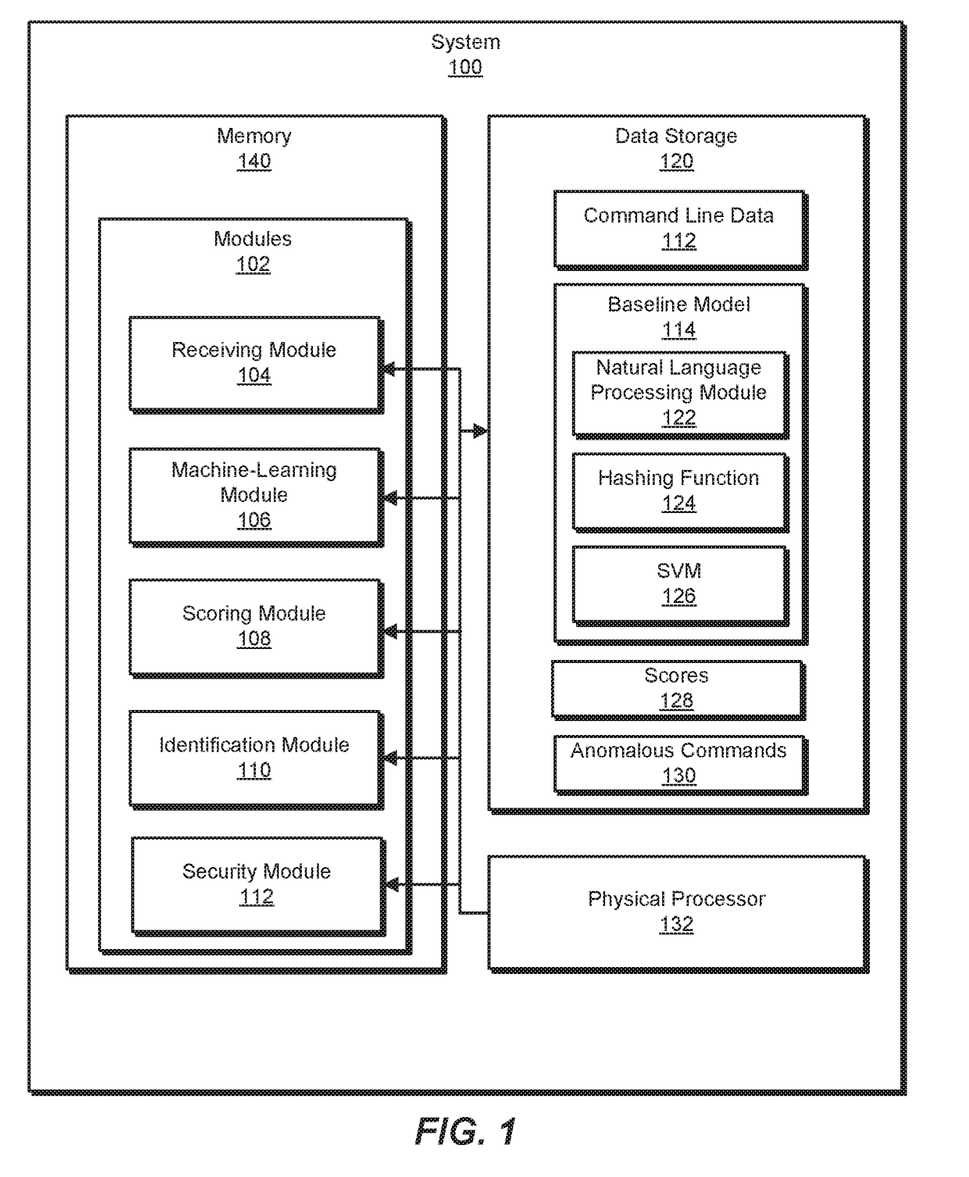
FIG. 1 is a block diagram of an example system for detecting anomalous system command line data.
Figure 2:
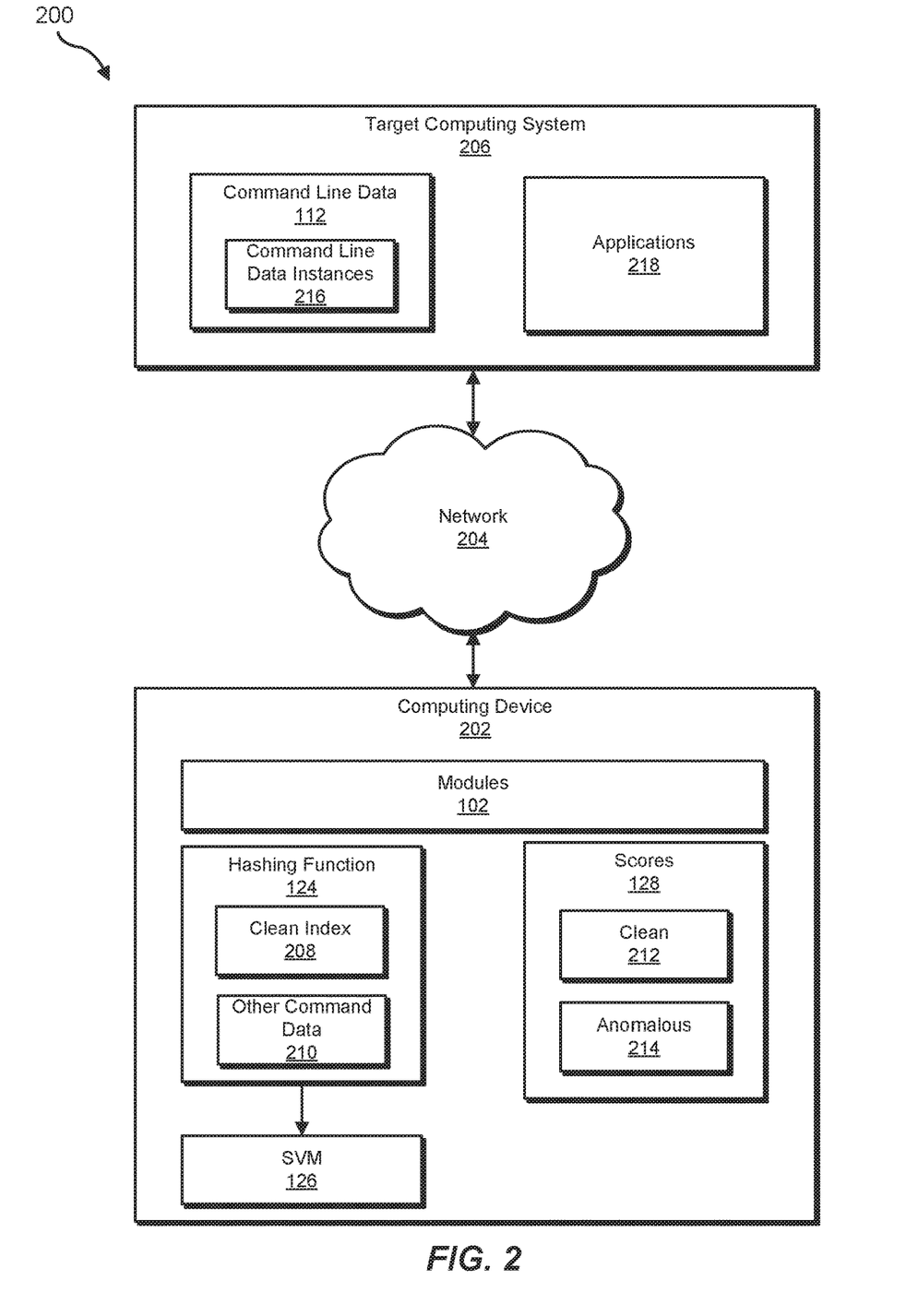
FIG. 2 is a block diagram of an additional example system for detecting anomalous system command line data.

The following will provide, with reference to FIGS. 1-2, detailed descriptions of example systems for detecting anomalous system command line data. Detailed descriptions of corresponding computer-implemented methods will also be provided in connection with FIGS. 3-4. A detailed description of baseline model data utilized in an example system for detecting anomalous command line data will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting anomalous system command line data. In certain embodiments, one or more of modules 102 in FIG. 1 may represent one or more software applications or programs that, when executed by a computing device, may cause the computing device to perform one or more tasks. For example, and as will be explained in greater detail below, example system 100 may include a receiving module 104 that receives command line data from a target computing system. Example system 100 may additionally include a machine-learning module 106 that builds a baseline model that utilizes machine-learning to analyze the command line data. The baseline model may include a support-vector machine (SVM), natural language processing, and a hashing function. Example system 100 may also include a scoring module 108 that assigns, utilizing the baseline model, a score to each of a plurality of instances of the command line data. Example system 100 may additionally include an identification module 110 that identifies, based on the score, anomalous commands including potentially malicious data when any of the instances of the command line data fails to exceed a threshold. Example system 100 may also include a security module 111 that performs a security action that performs a security action including reporting the anomalous commands including the potentially malicious data to a network security administrator for analysis. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or target computing system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 132. Physical processor 132 generally represents any type or form of hardware-implemented processing unit capable of interpreting and/or executing computer-readable instructions. In one example, physical processor 132 may access and/or modify one or more of modules 102 stored in memory 140. Additionally or alternatively, physical processor 132 may execute one or more of modules 102 to facilitate detecting anomalous system command line data. Examples of physical processor 132 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store command line data 112. In some examples, command line data 112 may include POWERSHELL command line data. Data storage 120 may also include baseline model 114. Baseline model 114 (which may be a machine-learning model) may include a natural language processing module 122, a hashing function 124, and a support-vector machine (SVM) 126. Data storage 120 may additionally include scores 128 generated by scoring module 108. Data storage 120 may also include anomalous commands 130 identified by identification module 110.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with target computing system 206 via a network 204. In one example, all or a portion of the functionality of modules 102 may be performed by computing device 202, target computing system 206, and/or any other suitable computing system. As will be described in greater detail below, one or more of modules 102 from FIG. 1 may, when executed by at least one processor of computing device 202 and/or target computing system 206, enable computing device 202 and/or target computing system 206 to detect anomalous system command line data.

Computing device 202 generally represents any type or form of computing device capable of reading computer-executable instructions. In some embodiments, computing device 202 may be a server computing device running security software implemented as part of a targeted attack analytics (TAA) service and configured to generate threat protection incident reports. Additional examples of computing device 202 include, without limitation, security servers, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Target computing system 206 generally represents any type or form of computing device that is capable of reading computer-executable instructions. In some embodiments, target computing system 206 may be one or more endpoint devices running POWERSHELL command line data. Additional examples of target computing system 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and target computing system 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Computing device 202 may include hashing function 124, SVM 126, and scores 128. Hashing function 124 may include a clean index 208 and other command data 210. In some examples, clean index 208 may represent common data (e.g., common commands utilized in command line data 112) known to be legitimate and/or having a high reputation. In some examples, other command data 210 may represent dual-use and unknown command line data including low reputation data and near duplicate data. Scores 128 may include clean scores 212 (which may be assigned to command line data instances 216 having a high reputation and/or include known common data and variations thereof) and anomalous scores 214 (which may be assigned to command line data instances 216 having a low reputation and/or failing to exceed a threshold associated with known common data).

The term "near duplicate data," as used herein, generally refers to any data (e.g., command data) having a degree of similarity to common or known command data. In some examples, near duplicate data may represent unique commands such as commands containing universally unique identifiers (UUIDs).

Figure 3:
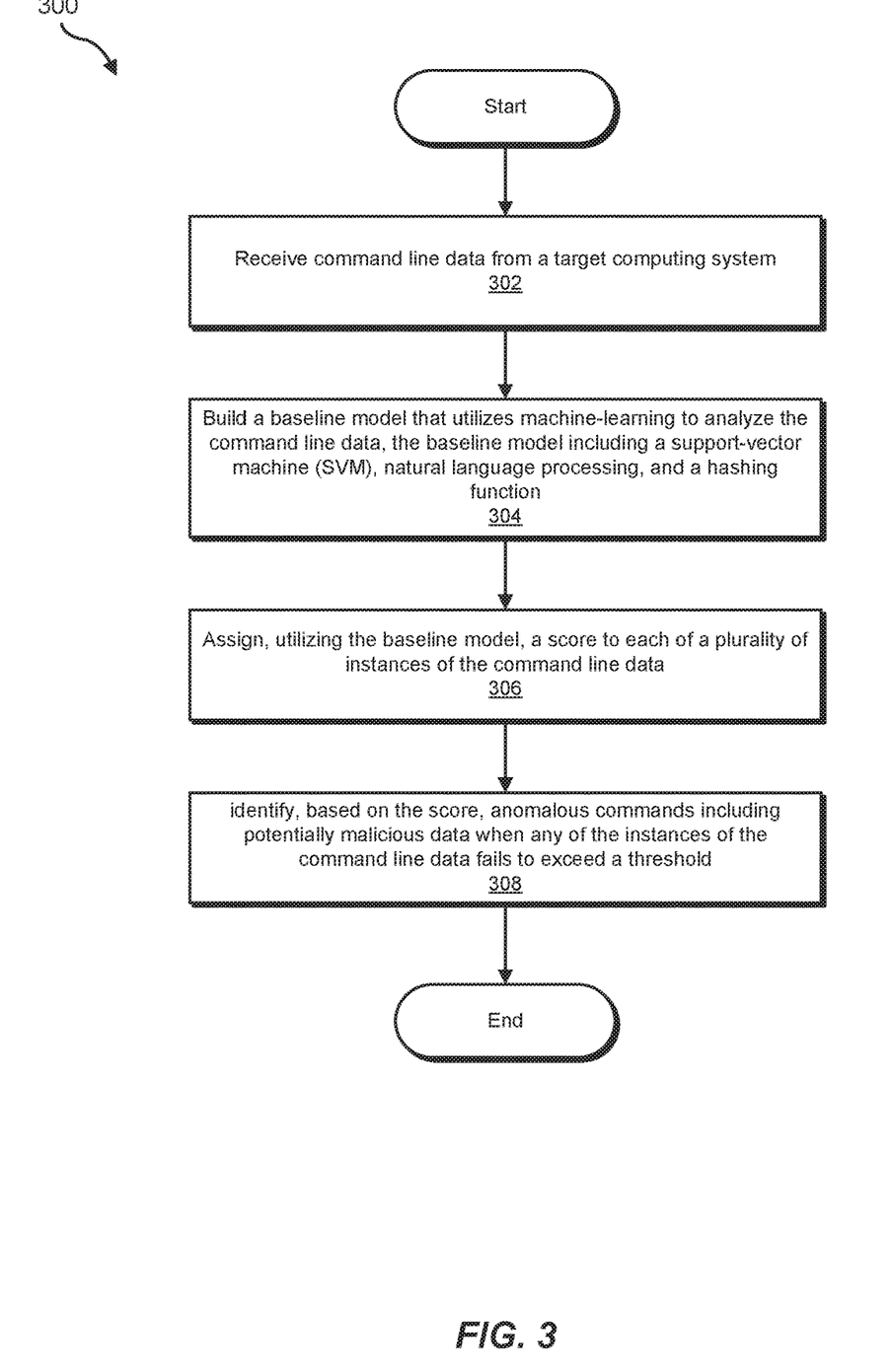
FIG. 3 is a flow diagram of an example method for detecting anomalous system command line data.

FIG. 3 is a flow diagram of an example computer-implemented method 300 for detecting anomalous system command line data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive command line data from a target computing system. For example, receiving module 104 may, as part of computing device 202 in FIG. 2, receive command line data 112 from target computing system 206.

Receiving module 104 may receive command line data 112 in a variety of ways. In some examples, receiving module 104 may receive data including commands (e.g., POWERSHELL commands) from a real-time monitoring application (e.g., an application 218) running on target computing system 206. Additionally or alternatively, receiving module 104 may receive data including commands from stored event logs associated with previously occurring security events on target computing system 206.

At step 304, one or more of the systems described herein may build a baseline model that utilizes machine-learning to analyze the command line data, the baseline model including a support-vector machine (SVM), natural language processing, and a hashing function. For example, machine-learning module 106 may, as part of computing device 202 in FIG. 2, build baseline model 114 that utilizes machine-learning to analyze command line data 112. Baseline model 114 may include natural language processing module 122, hashing function 124, and SVM 126. In some examples, hashing function 124 may be a combination of a minhash function and an LSH index. Machine-learning module 106 may build baseline model 114 in a variety of ways which will now be described with reference to FIG. 4.

Figure 4:
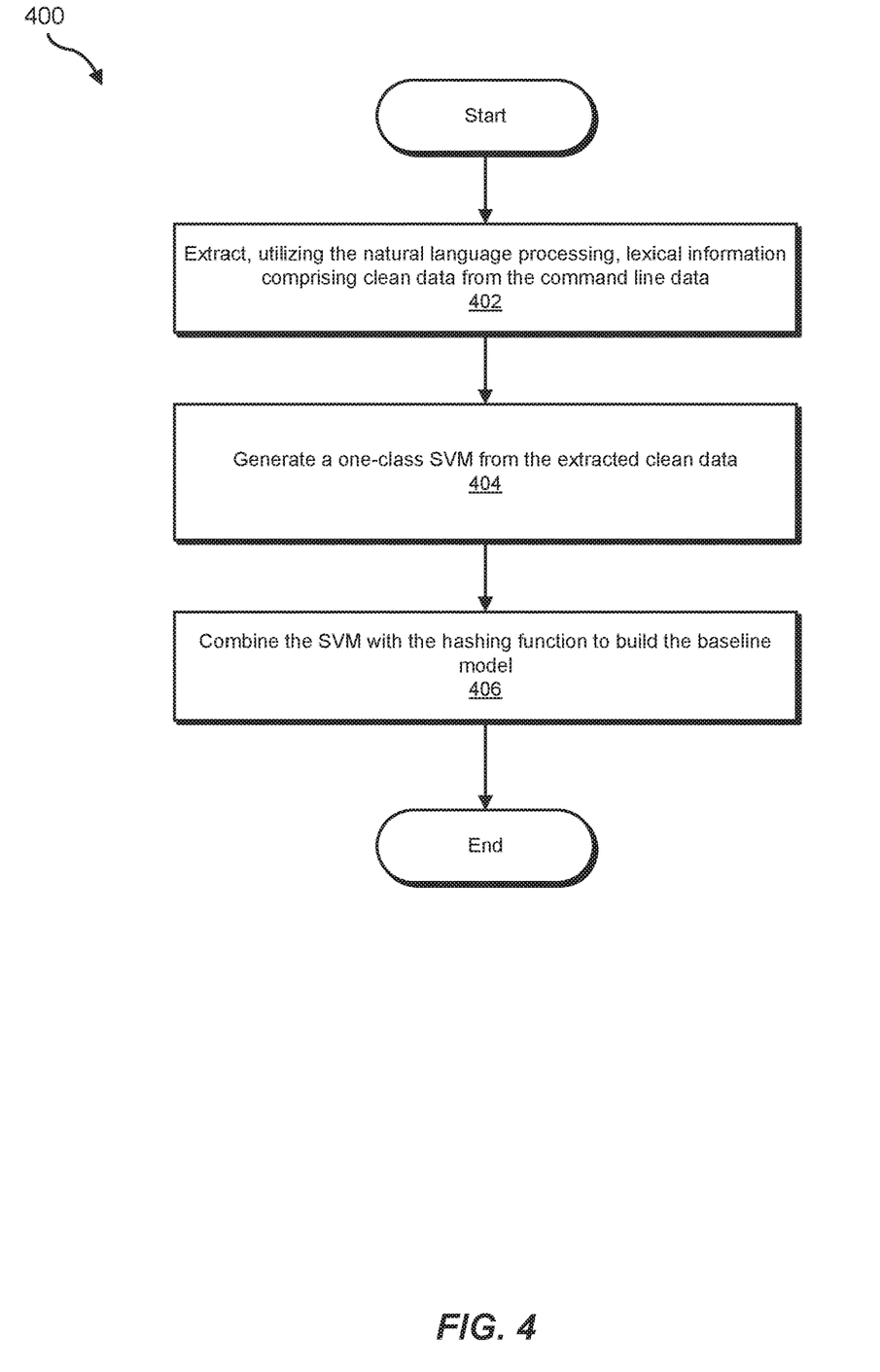
FIG. 4 is a flow diagram of an example method for building a baseline model for detecting anomalous system command line data.

FIG. 4 is a flow diagram of an example computer-implemented method 400 for building baseline model 114. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

Figure 5:
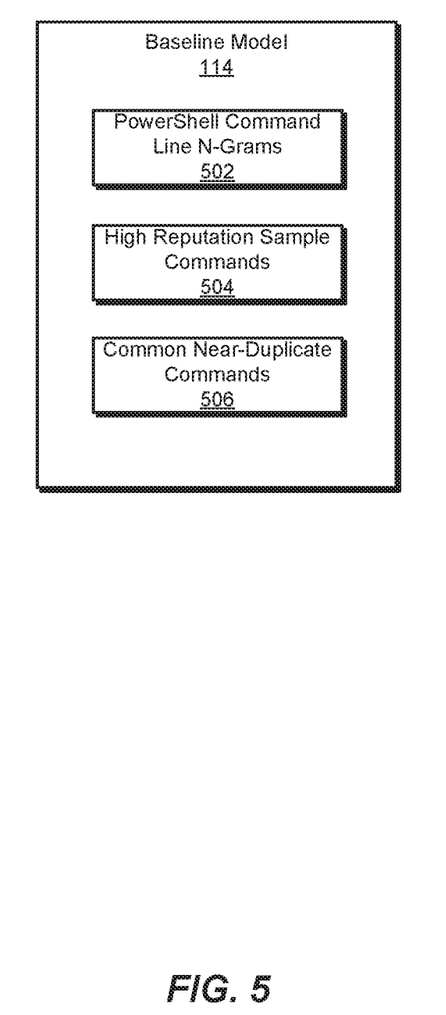
FIG. 5 is a block diagram of baseline model data utilized in an example system for detecting anomalous command line data.

As illustrated in FIG. 4, at step 402 one or more of the systems described herein may extract lexical information including clean data from command line data. For example, machine-learning module 106 may, as part of computing device 202 in FIG. 2, utilize natural language processing module 122 to extract lexical information including clean data from command line data 112. For example, as shown in FIG. 5, lexical information may include POWERSHELL command line n-grams 502 (e.g., 3-grams of POWERSHELL command lines seen on target environments) and clean data may include high reputation sample commands 504 and common near-duplicate commands 506.

At step 404, one or more of the systems described herein may generate a one-class SVM from the extracted clean data. For example, machine-learning module 106 may, as part of computing device 202 in FIG. 2, may generate SVM 126 as a one-class SVM from the extracted clean data.

At step 406, one or more of the systems described herein may combine the SVM with the hashing function to build the baseline model. For example, machine-learning module 106 may, as part of computing device 202 in FIG. 2, may combine SVM 126 with hashing function 124 to build baseline model 114.

Returning now to FIG. 3, at step 306, one or more of the systems described herein may assign, utilizing the baseline model, a score to each of a plurality of instances of the command line data. For example, assignment module 106 may, as part of computing device 202 in FIG. 2, assign, utilizing baseline model 114, scores 128 to each of command line data instances 216.

Assignment module 106 may assign scores 128 in a variety of ways. In some examples, assignment module 106 may (i) receive command line data instances 216 in hashing function 124 of baseline model 114, (ii) identify a target data instance in command line data instances 216 having commands that are present in clean index 208 of hashing function 124, and assign clean score 212 to the target data instance. Additionally or alternatively, assignment module 106 may (i) receive command line data instances 216 in hashing function 124, (ii) identify a target data instance in command line data instances 216 having commands that are absent from clean index 208, (iii) determine that the commands in the target data instance exceed a threshold, and (iv) assign clean score 212 to the target data instance. In some examples, the threshold may be exceeded when the commands in the target data instance correspond to any common command line data associated with high reputation data. In one example, common command line data may be determined based on the number of times an application is run by a trusted dual-use application (e.g., a browser application) such as a POWERSHELL command that is repeated at leas once every X days (where X is a configurable time period).

Additionally or alternatively, assignment module 106 may (i) receive command line data instances 216 in hashing function 124, (ii) identify a target data instance in command line data instances 216 having commands that are absent from clean index 208, (iii) determine that the commands in the target data instance fail to exceed a threshold, (iv) receive the target data instance in SVM 126 from hashing function 124, (v) determine, utilizing SVM 126, that the commands in the target data instance are clean, and (vi) assign clean score 212 to the target data instance. In some examples, SVM 126 may determine that the target data instance is clean by determining that the commands include previously seen commands and/or a variant of previously seen commands in clean index 208 of hashing function 124. In some examples, the commands in the target data instance may include near duplicate commands utilized by a dual-use application (e.g., an application 218) on target computing system 206. In other examples, the commands in the target data instance may include low reputation data.

Additionally or alternatively, assignment module 106 may (i) receive command line data instances 216 in hashing function 124, (ii) identify a target data instance in command line data instances 216 having commands that are absent from clean index 208, (iii) determine that the commands in the target data instance fail to exceed the threshold, (iv) receive the target data instance in SVM 126 from hashing function 124, (v) determine, utilizing the SVM, that the commands in the target data instance are uncommon commands, and (vi) assign an anomalous score 214 to the target data instance. In some examples, uncommon commands may include commands that are not among the previously seen commands and/or variants of previously seen commands in clean index 208 of hashing function 124. Additionally or alternatively, uncommon commands may include commands having a low reputation.

At step 308, one or more of the systems described herein may identify, based on the score assigned at step 306, anomalous commands including potentially malicious data when any of the instances of the command line data fails to exceed a threshold. For example, identification module 108 may, as part of computing device 202 in FIG. 2, identify anomalous commands 130 for any command line data instances 216 having anomalous score 214. As discussed above, the assignment of anomalous score 214 is indicative of uncommon commands (i.e., commands that are not among previously seen commands and/or variants of previously seen commands by baseline model 114 and/or commands having a low reputation. Following the identification of anomalous commands 130, one or more of the systems described herein may send the identified anomalous commands 130 to security module 111 for reporting as potentially malicious data to a network security administrator for analysis and possible threat remediation.

As explained in connection with method 300 above, the systems and methods described herein provide for detecting anomalous system command line data, such as POWERSHELL command line data, that may be utilized for injecting exploits and obfuscating commands and arguments by attackers in computing environments. In some examples, a targeted attack analytics service running on a threat detection platform may be configured to build a baseline, using a combination of machine-learning tools including a one-class SVM ensemble combined with minhashing and an LSH index. The SVM ensemble may be utilized on command line data to separate the data from its origin by building a classifier. The minhash/LSH combination may be utilized to focus on dataset pairs which are likely to be similar and to build input data to the SVM ensemble for near-duplicates (e.g., unique commands such as commands containing UUIDs). The LSH index may further be divided into a clean index and a dual-use/unknown index for near duplicates that are common. The systems described herein may score the command line data by first receiving incoming data in LSH indexes and then vectorizing the data for input into a model. If data is present in the clean index or if it has a count, as a near duplicate, that exceeds a threshold, it is considered common. Otherwise, the data is put through the SVM ensemble which provides a final verdict for the data as either being anomalous or an already seen command or variant.

Figure 6:
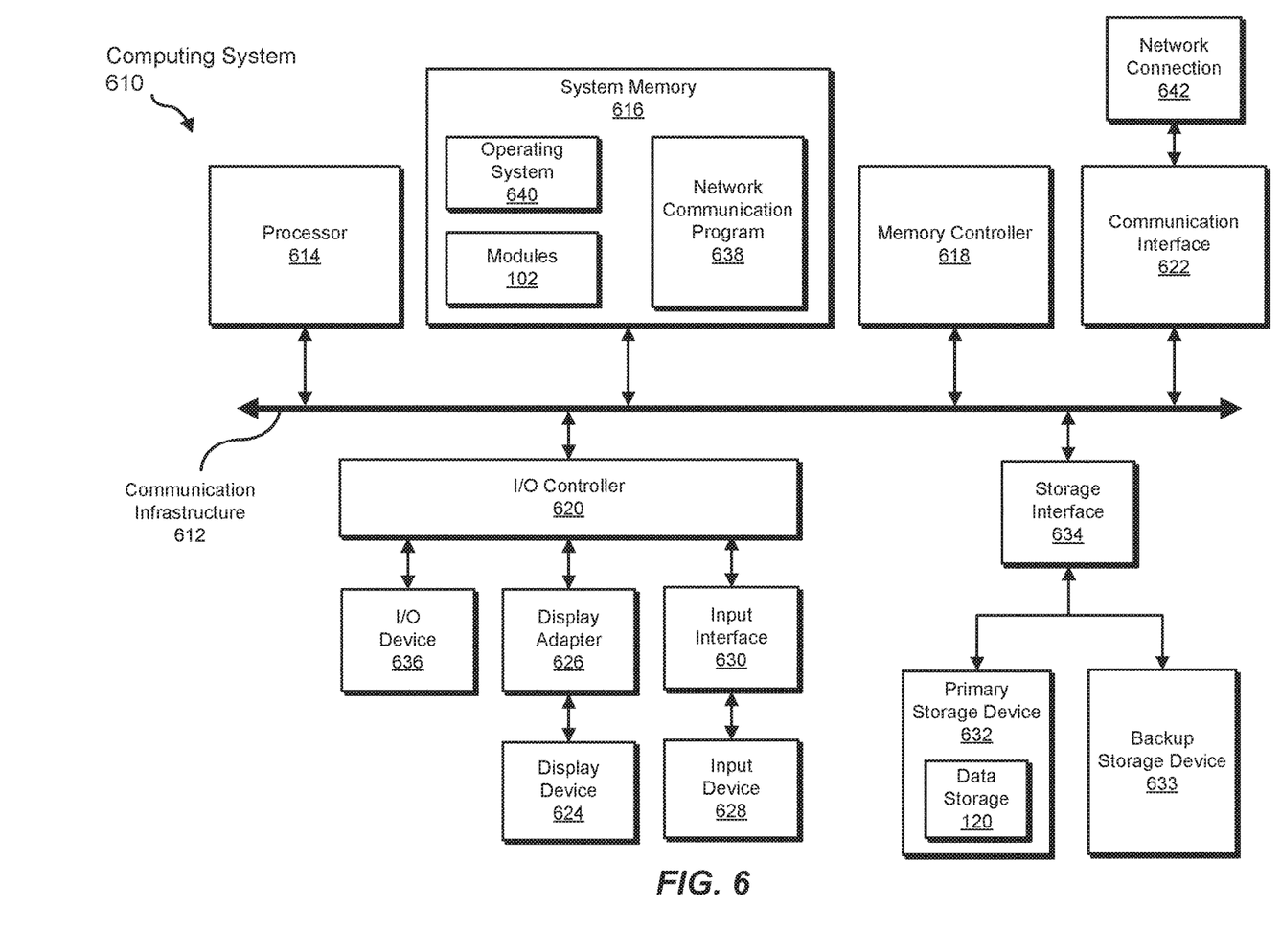
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
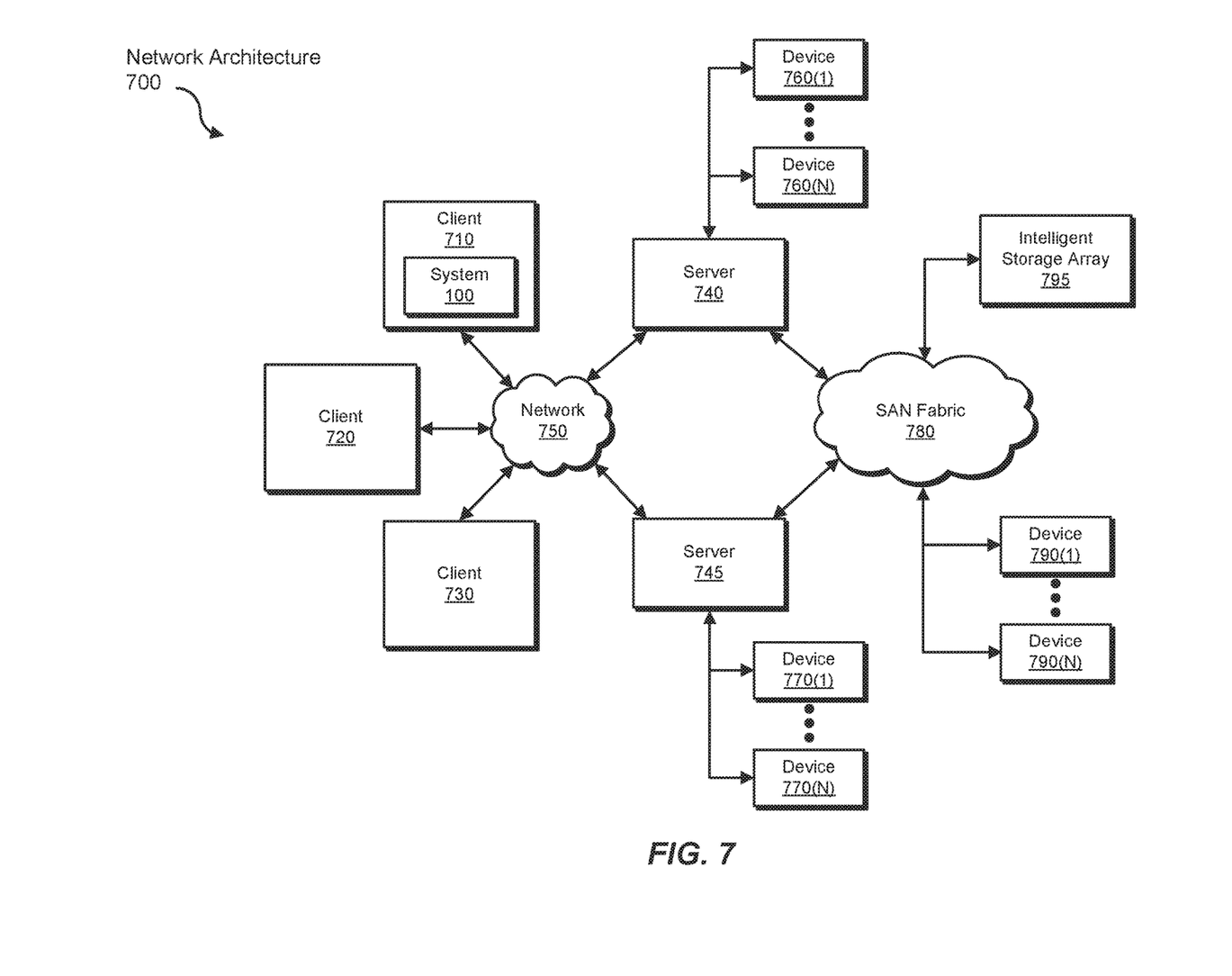
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting anomalous system command line data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting anomalous system command line data, at least a portion of the method being performed by one or more computing devices comprising at least one processor, the method comprising:
 receiving, by the one or more computing devices, command line data from a target computing system;
 building, by the one or more computing devices, a baseline model that utilizes machine-learning to analyze the command line data, the baseline model comprising a support-vector machine (SVM), natural language processing, and a hashing function;
 assigning, by the one or more computing devices and utilizing the baseline model, a score to each of a plurality of instances of the command line data; and
 identifying, by the one or more computing devices and based on the score, anomalous commands comprising potentially malicious data when any of the instances of the command line data fails to exceed a threshold.

2. The computer-implemented method of claim 1, further comprising performing a security action that includes reporting the anomalous commands comprising the potentially malicious data to a network security administrator for analysis.

3. The computer-implemented method of claim 1, wherein building the baseline model comprises:
extracting, utilizing the natural language processing, lexical information comprising clean data from the command line data;
generating a one-class SVM from the clean data; and
combining the SVM with the hashing function to build the baseline model.

4. The computer-implemented method of claim 1, wherein assigning the score comprises:
receiving the command line data instances in the hashing function;
identifying a target data instance in the command line data instances having commands that are present in a clean index of the hashing function; and
assigning a clean data score to the target data instance.

5. The computer-implemented method of claim 1, wherein assigning the score comprises:
receiving the command line data instances in the hashing function;
identifying a target data instance in the command line data instances having commands that are absent from a clean index in the hashing function;
determining that the commands in the target data instance exceed the threshold; and
assigning a clean data score to the target data instance.

6. The computer-implemented method of claim 1, wherein assigning the score comprises:
receiving the command line data instances in the hashing function;
identifying a target data instance in the command line data instances having commands that are absent from a clean index in the hashing function;
determining that the commands in the target data instance fail to exceed the threshold;
receiving the target data instance in the SVM from the hashing function;
determining, by the SVM, that the commands in the target data instance are clean; and
assigning a clean data score to the target data instance.

7. The computer-implemented method of claim 6, wherein determining, by the SVM, that the target data instance is clean comprises determining that the commands comprise at least one of previously seen commands or a variant of previously seen commands in a clean index of the hashing function.

8. The computer-implemented method of claim 6, wherein the commands comprise near duplicate commands utilized by a dual-use application on the target computing system.

9. The computer-implemented method of claim 6, wherein the commands comprise low reputation data.

10. The computer-implemented method of claim 1, wherein assigning the score comprises:
receiving the command line data instances in the hashing function;
identifying a target data instance in the command line data instances having commands that are absent from a clean index in the hashing function;
determining that the commands in the target data instance fail to exceed the threshold;
receiving the target data instance in the SVM from the hashing function;
determining, by the SVM, that the commands in the target data instance are uncommon commands; and
assigning an anomalous data score to the target data instance.

11. The computer-implemented method of claim 1, wherein the threshold comprises command line data samples associated with high reputation data.

12. The computer-implemented method of claim 1, wherein the hashing function comprises a minhash function and a locality-sensitive hashing index.

13. A system for detecting anomalous system command line data, the system comprising:
at least one physical processor;
physical memory comprising computer-executable instructions and one or more modules that, when executed by the physical processor, cause the physical processor to:
receive, by a receiving module, command line data from a target computing system;
build, by a machine-learning module, a baseline model that utilizes machine-learning to analyze the command line data, the baseline model comprising a support-vector machine (SVM), natural language processing, and a hashing function;
assign, by a scoring module and utilizing the baseline model, a score to each of a plurality of instances of the command line data; and
identify, by an identification module and based on the score, anomalous commands comprising potentially malicious data when any of the instances of the command line data fails to exceed a threshold.

14. The system of claim 13, wherein the machine-learning module builds the baseline model by:
extracting, utilizing the natural language processing, lexical information comprising clean data from the command line data;
generating a one-class SVM from the clean data; and
combining the SVM with the hashing function to build the baseline model.

15. The system of claim 13, wherein the scoring module assigns the score by:
receiving the command line data instances in the hashing function;
identifying a target data instance in the command line data instances having commands that are present in a clean index of the hashing function; and
assigning a clean data score to the target data instance.

16. The system of claim 13, wherein the scoring module assigns the score by:
receiving the command line data instances in the hashing function;
identifying a target data instance in the command line data instances having commands that are absent from a clean index in the hashing function;
determining that the commands in the target data instance exceed the threshold; and
assigning a clean data score to the target data instance.

17. The system of claim 13, wherein the scoring module assigns the score by:
receiving the command line data instances in the hashing function;
identifying a target data instance in the command line data instances having commands that are absent from a clean index in the hashing function;
determining that the commands in the target data instance fail to exceed the threshold;

receiving the target data instance in the SVM from the hashing function;

determining, by the SVM, that the commands in the target data instance are clean; and assigning a clean data score to the target data instance.

18. The system of claim 17, wherein the SVM determines that the target data instance is clean by determining that the commands comprise at least one of previously seen commands or a variant of previously seen commands in a clean index of the hashing function.

19. The system of claim 17, wherein the commands comprise near duplicate commands utilized by a dual-use application on the target computing system.

20. A non-transitory computer-readable medium comprising one or more computer-executable instructions that, when executed by at least one processor of a computing device, cause the computing device to:

receive command line data from a target computing system;

build a baseline model that utilizes machine-learning to analyze the command line data, the baseline model comprising a support-vector machine (SVM), natural language processing, and a hashing function;

assign, utilizing the baseline model, a score to each of a plurality of instances of the command line data; and identify, based on the score, anomalous commands comprising potentially malicious data when any of the instances of the command line data fails to exceed a threshold.

\* \* \* \* \*